US007843511B2

(12) United States Patent  (10) Patent No.: US 7,843,511 B2
Kang et al.  (45) Date of Patent: Nov. 30, 2010

(54) APPARATUS AND METHOD FOR COMBINING IMAGES IN A TERMINAL DEVICE

(75) Inventors: Yong-Sung Kang, Gyeonggi-Do (KR); Sung-Ho Lee, Gyeonggi-Do (KR); Hyung-Jin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1234 days.

(21) Appl. No.: 11/286,484

(22) Filed: Nov. 23, 2005

(65) Prior Publication Data

US 2006/0114363 A1   Jun. 1, 2006

(30) Foreign Application Priority Data

Nov. 26, 2004   (KR) ...................... 10-2004-0098202

(51) Int. Cl.
*H04N 9/74*   (2006.01)
(52) U.S. Cl. ..................................... 348/584
(58) Field of Classification Search .................. 348/725
See application file for complete search history.

(56) References Cited

U.S. PATENT DOCUMENTS

| 6,297,851 | B1 * | 10/2001 | Taubman et al. ............ 348/572 |
| 6,563,948 | B2 * | 5/2003 | Tan et al. .................... 382/187 |
| 6,658,057 | B1 * | 12/2003 | Chen et al. .................. 375/240 |
| 7,250,983 | B2 * | 7/2007 | Lin et al. ..................... 348/584 |
| 7,567,297 | B2 * | 7/2009 | Worry et al. ................ 348/578 |
| 2004/0075654 | A1 * | 4/2004 | Hsiao et al. ................. 345/418 |
| 2004/0119850 | A1 | 6/2004 | Squibbs |
| 2004/0120584 | A1 * | 6/2004 | Jang et al. ................... 382/232 |
| 2006/0177150 | A1 * | 8/2006 | Uyttendaele et al. ........ 382/284 |

FOREIGN PATENT DOCUMENTS

| CN | 1427619 | 7/2003 |
| CN | 1488132 | 4/2004 |
| EP | 1396997 A2 | 3/2004 |
| EP | 1453306 | 9/2004 |
| JP | 2002010227 | 1/2002 |
| JP | 2004005492 | 1/2004 |
| JP | 2004088327 | 3/2004 |

(Continued)

OTHER PUBLICATIONS

Jokela T: "Authoitng tools for mobile multimedia content" Proceedings of the 2003 international conference on multimedia and expo (ICME 2003), Baltimore, MD, Jul. 6-9, 2003, vol. 2, Jul. 6IEEE, Pscataway, 2003, pp. II-637-II-640, XP010650636, Piscataway, NJ.

*Primary Examiner*—Paulos M Natnael
(74) *Attorney, Agent, or Firm*—Lee, Hong, Degerman, Kang & Waimey (57) ABSTRACT

An apparatus and method for combining images of a mobile terminal that receives broadcast image signals. A capture module is used for capturing and storing a specific scene of a broadcast image; a first processor is used for selecting a first image of images stored in the terminal, converting the first image into a translucent image, scaling down the first image, or extracting an object image from the first image; and a second processor is used for selecting a second image of the images stored in the terminal and overlapping the scaled-down image or the object image onto the second image.

21 Claims, 9 Drawing Sheets

FOREIGN PATENT DOCUMENTS

| | | |
|---|---|---|
| JP | 2004134950 | 4/2004 |
| JP | 2004164668 | 6/2004 |
| JP | 2004-208277 | 7/2004 |
| JP | 2004208277 | 7/2004 |
| JP | 2004-304309 | 10/2004 |
| JP | 2004304309 | 10/2004 |
| JP | 2004312162 | 11/2004 |
| KR | 1020050091125 A | 9/2005 |
| WO | 01/24518 | 4/2001 |
| WO | WO 02-085018 A | 10/2002 |
| WO | WO 02-086740 A2 | 10/2002 |
| WO | WO 2004-051658 A1 | 6/2004 |

\* cited by examiner

APPARATUS AND METHOD FOR COMBINING IMAGES IN A TERMINAL DEVICE

CROSS REFERENCE TO RELATED APPLICATIONS

Pursuant to 35 U.S.C. §119(a), this application claims the benefit of earlier filing date and right of priority to Korean Application No. 98202/2004, filed on Nov. 26, 2004, the contents of which are hereby incorporated by reference herein in their entirety.

BACKGROUND OF THE INVENTION

1. Field of the Invention

The present invention relates to an apparatus and method for combining images of a terminal and, more particularly, to an apparatus and method for combining images of a terminal capable of capturing broadcast images received by a terminal and combining them.

2. Description of the Related Art

A mobile communication terminal is a cutting-edge wireless communication device allowing a user to wirelessly communicate with another party through a communication path set by a mobile switching center (MSC) while freely moving in a service area served by a base station which belongs to a system to which the user's terminal has subscribed and registered.

In general, the mobile terminal is used for communications for relatively short durations and remains in standby state for a relatively long time, resulting in a low usage rate. Thus, in order to increase the low usage rate and user convenience, various supplementary services have been developed for the mobile terminal.

Of the supplementary services, a wireless Internet connectivity, text messaging, multimedia messaging, wireless online games, and the like, are received by the user from a service provider through wireless access, while a phone book, a message editor, a calculator, games, a camera, infrared transmission features, Bluetooth® connectivity, setting of ringtones, and the like, are pre-installed in mobile terminals by phone manufacturers.

Also, supplementary services include digital multimedia broadcasting (DMB) service functions. The DMB is based upon DAB (Digital Audio Broadcasting) and being commercialized as a so-called "mobile TV" feature. While the DAB relates to digital audio radio broadcasting, the DMB relates to digital radio broadcasting that encompasses visual and audible multimedia contents. It can be said that DAB has evolved into as has been re-named as DMB with the added characteristics of multimedia broadcasting. The DMB can be divided into a terrestrial DMB (TDMB) for transmitting broadcast signals from land-based systems, and a satellite DMB (SDMB) for transmitting broadcast signals from satellite systems above the earth.

The TDMB is a mobile multimedia broadcast system providing high quality voice and image services to users at virtually anytime and anywhere, by extending the concept of radio broadcasting from 'audio broadcasts' to 'visual and audio broadcasts'. With its excellent mobile reception characteristics, the TDMB can transfer diverse contents such as text, music, and video through a mobile terminal, PDA, or other wireless devices having broadcast reception capabilities.

The SDMB can provide audio and supplementary data, or a multimedia broadcast service including video content to a fixed (land-line) receiver or a mobile receiver through a satellite system connection. Since the SDMB can provide various qualities of audio broadcast services at low cost through use of satellite technology, it is anticipated to be one type of next-generation service that can cover wide geographical areas, to thus remarkably enlarge the coverage of existing broadcast services. Accordingly, the SDMB has emerged as a representative service of the on-going 'digital convergence' trend, whereby communications services and broadcasting service merge together.

Equipment and devices for providing the DMB service includes a mobile communication terminal having a digital multimedia broadcast reception function, a car terminal mounted in a vehicle to receive DMB signals, and a home terminal for receiving DMB signals through fixed devices installed at the home.

The DMB system can broadcast voice type signals in a digital manner by dividing a given frequency band according to a CDMA method, and employs radio channels for wireless access, TV channels for broadcasting multimedia type signal, and data channels for broadcasting data signals.

Each channel in DMB broadcasting is used to broadcast different contents according to set themes or topics, and various channels, such as news channels, sports channels, music channels, entertainment channels, drama channels, movie channels, religious channels, cultural channels, department channels, educational channels, or the like, may exist.

Figure 1:
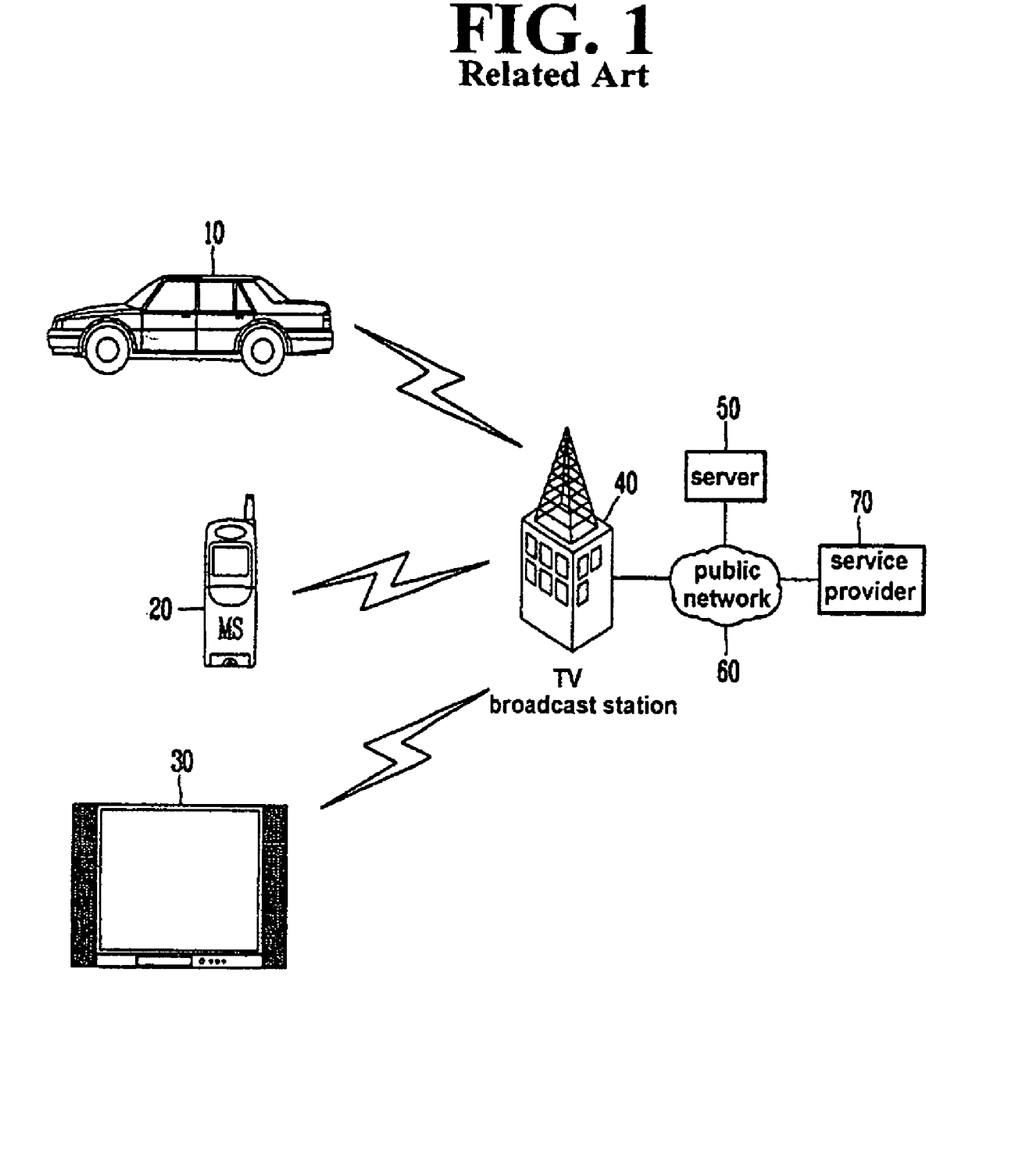
FIG. 1 illustrates a general digital multimedia broadcast system.

FIG. 1 illustrates an exemplary construction of a general digital multimedia broadcast system. As shown, the general digital multimedia broadcast system comprises a car terminal 10 for receiving broadcast signals, a mobile communication terminal 20, a home terminal 30, a TV broadcast station 40 for transmitting broadcast signals, an Internet server 50 of a service provider for storing broadcast contents, a service provider 70 for generating broadcast images and broadcast data for a DMB service, and a public network 60 for connecting the Internet server 50 and the service provider 70.

The TV broadcast station 40 broadcasts various contents with themes through broadcast channels according to the DMB method. A TV broadcast signal that is broadcast to each channel is received by the car terminal 10, the mobile terminal (or mobile station: MS) or the home terminal (TV) 30.

The TV broadcast station 40 can broadcast the TV broadcast signal through a fixed line via the public network 60. For example, the TV broadcast station 40 stores previously broadcast contents in units of files within the Internet server 50 included in the public network 60, to allow a user of the terminal that is connected through the fixed line for viewing the broadcast contents at a convenient time.

The service provider 70 creates a broadcast schedule program log of each channel, content or a plot of each program as text data and transmits it to the TV broadcast station 40 through the public network 60, and the TV broadcast station 40 broadcasts the data through a fixedly allocated EPG channel.

The car terminal 10, the terminal (MS) 20 or the home terminal 30 can receive a schedule program log transmitted as data through the EPG channel of the TV broadcast station 40, and can selectively receive a broadcast program according to the schedule program log.

Figure 2:
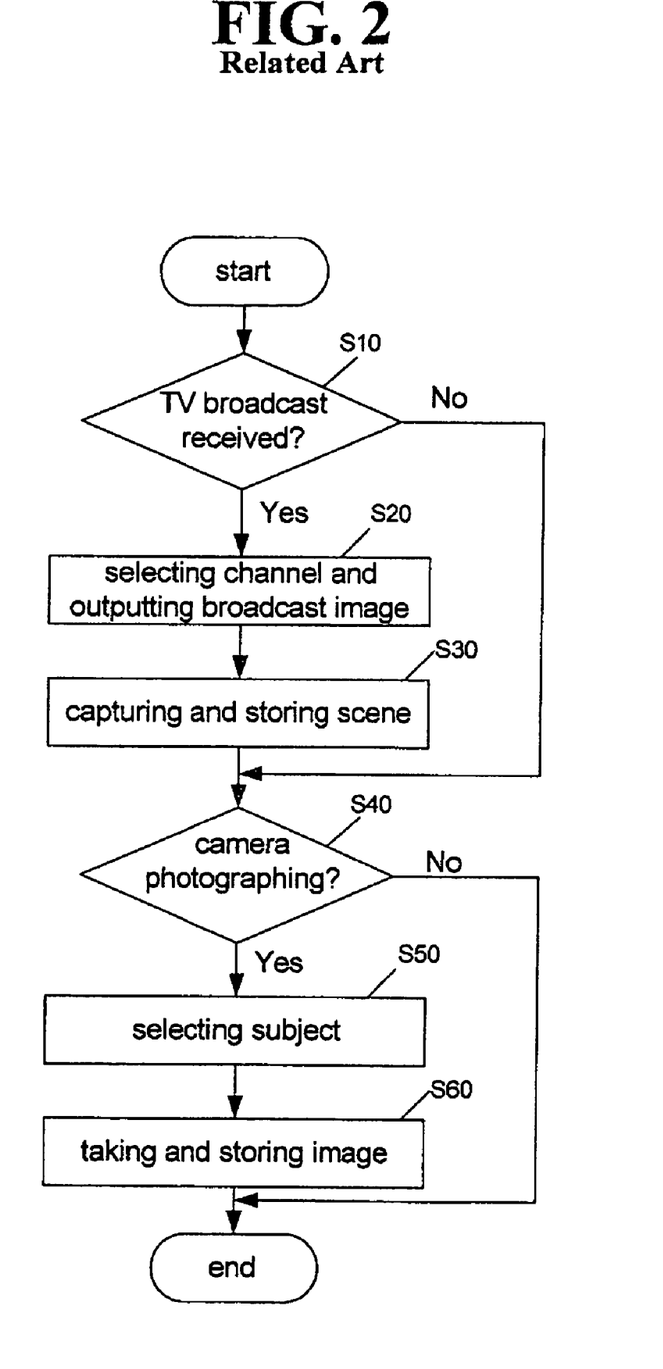
FIG. 2 is a flow chart illustrating the processes of a method for recording an image of terminal in accordance with a related art.

An image recording method of the terminal in accordance with a related art will now be described with reference to FIG. 2. The terminal, which has a TV broadcast reception function and a camera function, can record (save) obtained images or videos by using the functions as follows.

When the TV broadcast reception function of the terminal is selected (step S10), one of a plurality of broadcast channels is selected and a broadcast image received via the channel is outputted (step S20). A specific scene of the broadcast image outputted through a screen can be captured and stored (step S30). In addition, the broadcast image outputted on the screen of the terminal can be recorded during a certain time interval to store the corresponding video.

Meanwhile, when the camera image taking function is selected (step S40), a subject to be captured to obtain its image is selected and displayed as a preview image on the screen (step S50). When an image taking select button is pressed, a still image of the selected subject is captured and stored (step S60). If a video record function is included in the camera function, moving images (video) of the selected subject can be recorded during a pre-set time and then stored.

Accordingly, video or a still image can be stored through the TV broadcast reception function, and also videos or still images captured through the camera function can be also stored.

BRIEF DESCRIPTION OF THE INVENTION

The present inventors recognized that, in the related art, the images stored through the digital video broadcast reception function and the images stored through the camera function are processed and stored separately, and such related art mobile communication terminals with image processing capabilities do not properly support the combining (or merging) of these two types of images. Allowing such feature would be convenient for users who may wish to create their own unique images or edit still images and videos together based on images from received digital video broadcast signals.

Therefore, one object of the present invention is to provide an apparatus and method for combining images in a terminal having a function of receiving a broadcast image, capable of capturing a broadcast image and combining (merging) it with a different image stored in a terminal according to various methods.

Another object of the present invention is to provide an apparatus and method for combining images capable of combining a broadcast image being received and a preview image to be provided for being taken and allowing the two images to be checked simultaneously on one screen.

Still another object of the present invention is to provide an apparatus and method for combining images capable of simultaneously performing a TV broadcast reception function and an image capturing function by displaying a combined (composite) image of a broadcast image and a preview image on one screen.

To achieve at least the above objects in whole or in parts, there is provided an apparatus for combining image of a terminal which receives a broadcast image signal, comprising: a capture module for capturing and storing a specific scene of a broadcast image; a first processor for selecting a first image of images stored in the terminal and converting it into a translucent image; and a second processor for selecting a second image of the images stored in the terminal and overlapping the first image on the second image.

To achieve at least these advantages in whole or in parts, there is further provided an apparatus for combining image of a terminal which receives a broadcast image signal, comprising: a capture module for capturing and storing a specific scene of a broadcast image; a first processor for selecting first and second images of images stored in the terminal and converting them into translucent images; and a second processor for overlapping the first image on the second image.

To achieve the above object, there is further provided an apparatus for combining images of a terminal which receives a broadcast image signal comprising: a capture module for capturing and storing a specific scene of a broadcast image; a first processor for selecting and scaling down a first image of images stored in the terminal; and a second processor for selecting a second image of the images stored in the terminal and overlapping the first image on the second image.

To achieve at least these advantages in whole or in parts, there is further provided an apparatus for combining images of a terminal which receives a broadcast image signal comprising: a capture module for capturing and storing a specific scene of a broadcast image; a first processor for selecting a first image of images stored in the terminal and extracting an object image from the first image; and a second processor for selecting a second image of the images stored in the terminal and overlapping the object image on the second image.

To achieve at least these advantages in whole or in parts, there is further provided an apparatus for compositing images of a terminal which receives a broadcast image signal comprising: a capture module for capturing and storing a specific scene of a broadcast image; a first processor for selecting a first image of images stored in the terminal, converting the first image into a translucent image, scaling down the first image, or extracting an object image from the first image; and a second processor for selecting a second image of the images stored in the terminal and overlapping the scaled-down image or the object image on the second image.

To achieve at least these advantages in whole or in parts, there is further provided a method for compositing images of a terminal having a broadcast image reception function, comprising: capturing and storing a broadcast image; selecting first and second images from images stored in the terminal; converting the first image according to an image compositing mode set in the terminal; and overlapping the first image on the second image.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE INVENTION

The apparatus and method for combining images of the terminal in accordance with the present invention will now be described with reference to the accompanying drawings.

Hereafter, the term "terminal" is intended to refer to and cover various types of communication devices that support mobility (or may be fixed) and allows communication of information via wired and/or wireless interfaces.

Also, the present invention will be explained with reference to digital multimedia broadcasting (DMB) technology, that includes satellite DMB and terrestrial DMB. However, it can be understood that the teachings and suggestions of the present invention are applicable to other types of broadcast signal reception techniques that have similarities with DMB technology, such as DVB-H (digital video broadcast-handheld).

In the following exemplary description regarding the present invention features, it can be understood that communication devices (terminals, handsets, PDAs, notebook computers, etc.) supporting DMB technology are being implemented with various image processing functions in order to enhance the multimedia experience for the user. To do so, many technical aspects need to be considered.

For example, supporting DMB technology requires certain signal processing and memory capabilities. Device mobility issues may also need to be addressed for those devices that may be carried around by the user. Also, battery power limitations and minimal power consumption are important considerations. As the additional image processing capabilities of the present invention would require more processing power, battery consumption, memory requirements, and the like, a balance of all these aspects need to be considered and achieved together with the DMB processing requirements.

Figure 3:
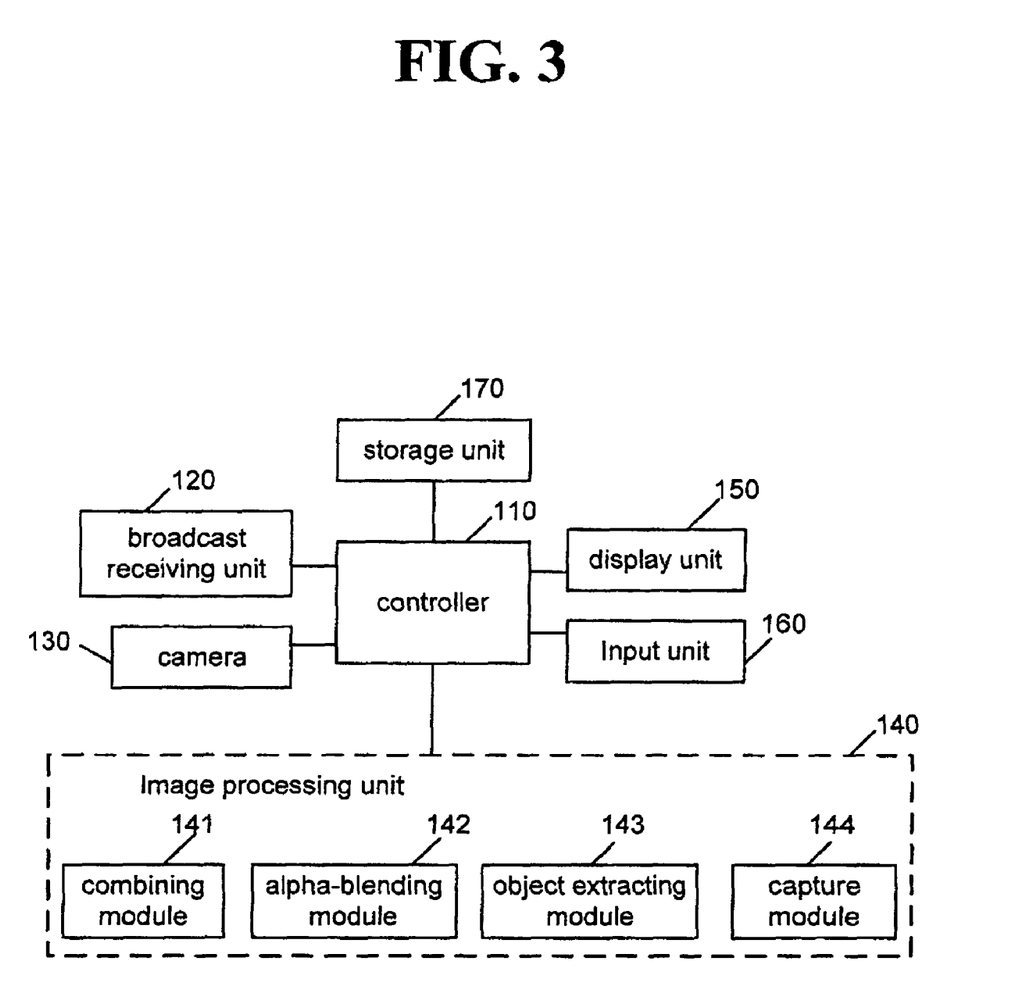
FIG. 3 shows an exemplary construction of an apparatus for combining images of a terminal in accordance with the present invention.

FIG. 3 illustrates an exemplary apparatus for combining images of the mobile terminal in accordance with the present invention. As shown, the terminal may comprise a broadcast receiving unit 120 for receiving digital multimedia broadcast signals, a camera 130 for capturing still images or videos; an image processing unit 140 for processing image signals and data inputted to the terminal; a display unit 150 for visually outputting images and videos; an input unit 160 for receiving user commands; a storage unit 170 for storing various data including image data; and a controller 110 generally controlling each element.

As can be understood, other components exist within a mobile communications terminal, but such will not be discussed in detail to prevent the characteristics of the present invention from being obscured.

The camera 190 may be used to capture images or videos of a subject or object, and may include a camera sensor for converting optical signals into electrical signals. Here, the camera sensor can be implemented as a CCD sensor. In the present invention, the camera 190 is preferably an internal (integral) camera, but an external camera being connected to the mobile terminal mat also be used. Images taken by the camera 190 can be stored in a region allocated in the storage unit 170. Other types of image capture devices, not only cameras, may also be used as well.

The image processing unit 140 may include a combining module 141, an alpha-blending module 142, an object extracting module 143, and a capture module 144. It can be understood that these modules may be implemented in hardware, software, and/or a combination thereof. Such modules may be implemented within the terminal itself or some may be located in external sources. It may be beneficial to have come image processing be performed externally in order to minimize the burden on the terminal. Various types of wired and/or wireless interfaces may be employed to communicate between the terminal and the external sources.

The alpha-blending module 142 may convert a selected one of a broadcast image and a camera-taken image into a translucent state (or relatively semi-transparent state), such that although the selected image is combined onto a background image, it can be processed in the translucent state while allowing the background image to still be visible.

The object extracting module 143 may extract a contour (outline) of a designated object from the broadcast image received by the broadcast receiving unit 120 or from the image taken by the camera 130. This may be achieved through graphics image processing that may "automatically" detect the contours and outlines of objects, or may be achieved through the user, who may actually trace the contour or outline of an object in an image via a pen-based input or other user selection interface means.

The capture module 144 may capture a specific scene of the broadcast image being received, or captures a specific scene when the broadcast image or the captured video stored in the terminal is reproduced. The image captured by the capture module 144 may be stored in the storage unit 170 (described hereafter).

The combining module 141 may process a target image selected to be signal-processed by alpha blending to allow OSD (On Screen Display) combining with a background image, or to allow picture size adjustment (scaling up or down) for PIP (Picture-In-Picture) combining with the background image, or to allow extracting of a specific object for overlapping with the background image.

The controller 110 may control a broadcast receiving part 120, a camera 130, an image processing unit 140, a display unit 150, an input unit 160 and a storage unit 170 as follows.

The controller 110 may store a selected portion of a broadcast image received by the broadcast receiving unit 120, an image taken by the camera 130 and data with respect to a captured scene of the broadcast image in the storage unit 170.

The controller 110 may apply a target image signal to the object extracting module 143 to extract a contour line of a selected object, applies it to the alpha blending module 142 and converts it into a translucent state so that the background image can be seen, or applies it without processing to the compositing module 141, according to a command signal applied from the input unit 160.

The controller 110 controls the combining module 141 to perform PIP processing on the target image and the combined image (composite) for outputting the result to a designated position of the background image with a designated size, to perform OSD combining of the alpha-blended target image onto the background image and outputting the result, or to perform overlapping of the object-extracted target image onto the background image and outputting the result. Here, other kinds of display options may also be handled besides the above three types. For example, a plurality of target images may be overlapped onto a single background image. Also, combined images may effectively show that the target object is placed underneath the background image instead of being overlapped. Also, either the target image or the background may be comprised of still images or relatively short video clips or animation effects.

Also, the controller 110 can interchange and combine the target image and the background image according to a command signal inputted through the input unit 160. Namely, the user may select a desired display option or one may be set as a default.

Figure 4:
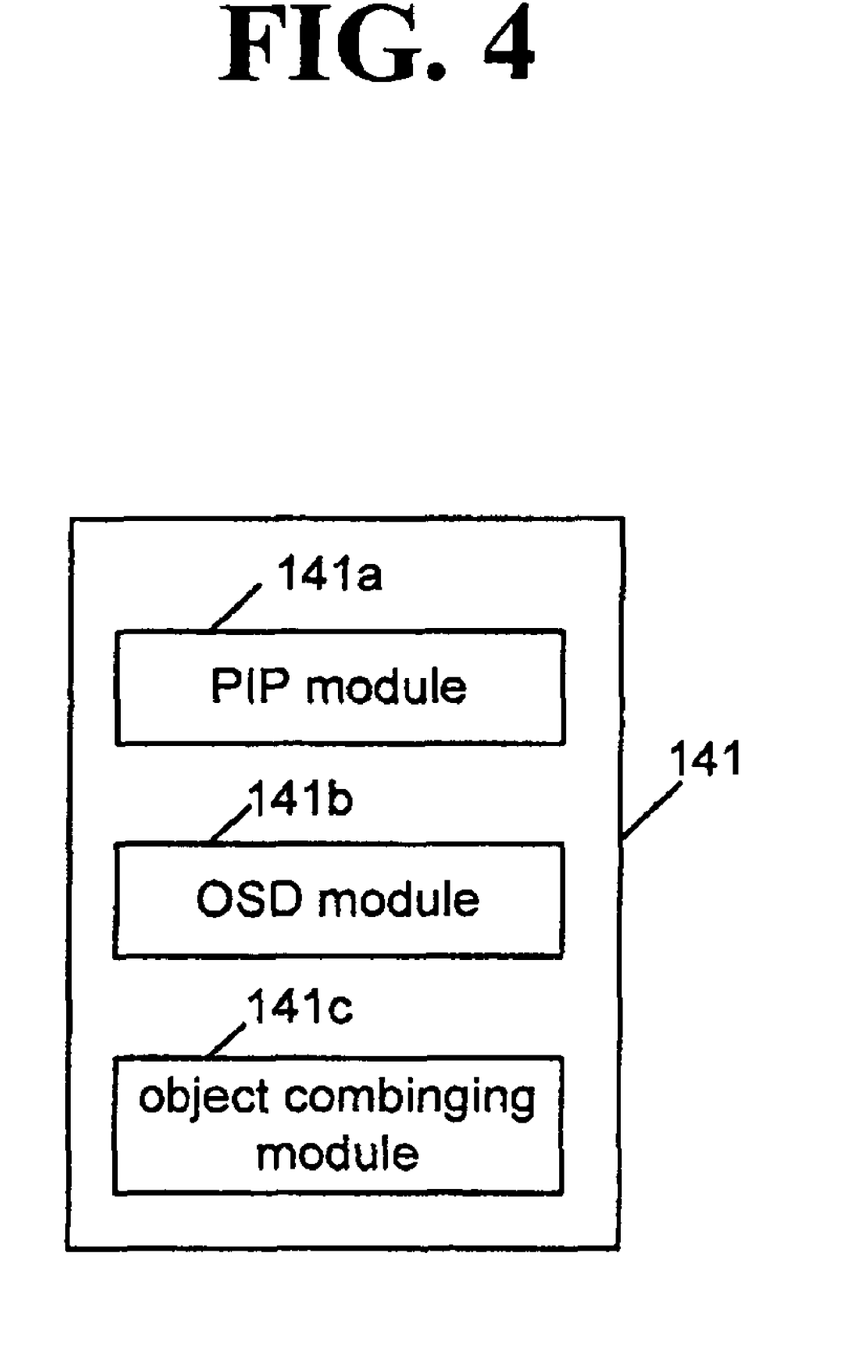
FIG. 4 is a detailed view showing an exemplary construction of a combining module of the terminal in accordance with the present invention.

An example of a detailed construction of the combining module 141 will be described with reference to FIG. 4.

The combining module 141 may combine a selected broadcast image with a photographed (camera-taken) image and then outputs the result on the display screen. The combining module 141 may include a PIP module 141a, a OSD module 141b, and/or an object combining module 141c.

The PIP module 141a may reduce or enlarge a selected image among the received broadcast image and/or the camera-taken image, and then outputs the result to a designated position of the background image under the control of the controller 110.

The OSD module 141b may perform alpha-blending of the selected image among the received broadcast image and the camera-taken image and then outputs the result in an overlapping manner onto the background image under the control of the controller 110.

The object combining module 141c may extract a specific object from the selected image among the received TV broadcast image and the camera-taken image and outputting it in an overlap state on the background image under the control of the controller 110.

Namely, under the control of the controller 110, the inputted broadcast image and the camera-taken image are distinguished as the target image and the background image. Then, the target image is PIP-processed or OSD-processed, or its object is extracted to be overlapped on the background image. Accordingly, the terminal user can simultaneously watch the broadcast image and the camera-taken image through one screen.

An exemplary operation procedure of the apparatus for combining images of the terminal constructed as described above will be explained in more detail as follows.

To begin with, it is assumed that the terminal in accordance with the present invention includes a TV broadcast reception function and a camera function, as well as a basic communication function.

The storage unit 170 of the terminal may be used to store the camera-taken image or the broadcast image, or separately store a captured portion or an object-extracted portion from the camera-taken image or from the broadcast image. The image processing unit 140 may perform the combining process by using the camera-taken image and the broadcast image stored in the storage unit 170. Here, it can be understood that the storage unit 170 may comprise various types of memory means, such as RAMs, ROMs, hard disk type memories, Flash memories, etc.

Also, the present invention may employ the so-called "time-machine" function that is used to continuously record portions of incoming broadcast signals upon its reception. A memory or buffer can be used to temporarily store the most recently received portions of the broadcast signals, for example, to store the most recent 60 minutes of received broadcast signals. As the broadcast program continues, the "older" broadcast program portions may be deleted such that only the most recent portions are updated into the memory or buffer having a limited size. As a result, despite brief periods of time when the user does not or cannot watch the broadcast program (such as when going to the restroom, taking an incoming phone call, etc.), the stored broadcast program portions can be reproduced to thus allow the user to, in effect, "continuously" view the desired broadcast program without missing any portions thereof.

The controller 110 may analyze a command received from the input unit 160 and performs a corresponding function. When a command for receiving a TV broadcast signal is inputted, the controller 110 controls the broadcast receiving unit 120 to receive the contents broadcast by a pertinent broadcast (TV) channel and outputs the received broadcast image through the display unit 150. When a capture command is inputted through the input unit 160 while the broadcast image is being outputted through the display unit 150, the controller captures the instantaneous image and records it in the storage unit 170.

Here, it an be understood that the display unit 150 may be implemented by using various types of displays. Examples may include liquid crystal display (LCD) screens, organic electro-luminescence (EL) display screens, light emitting diode LED screens, organic LEDs (OLED) screen, plasma display screens, etc.

When a command signal for capturing an image of a subject is inputted, the controller 110 may control the camera 130 to capture an image of the corresponding subject, and stores the captured image in the storage unit 170. The controller 110 may also determine whether to combine the stored captured image with the broadcast image by using the PIP method, the OSD method or the object extraction method or some other method that would be supported by the present invention.

For example, when the captured image and the broadcast image are to be combined according to the PIP method, signals of a target image to be edited may be applied to the PIP module 141a within the combining module 141. When a size adjustment is designated at the PIP module 141a, the target image may be adjusted to a designated size, and then, when a combining position is designated on the background image, the size adjusted target image may be combined at the designated position. Such combined images may then be stored in the storage unit 170, and may also be simultaneously outputted onto the display unit 150.

While watching a TV broadcast program, the user can take an image of a designated subjected through the camera 130 by using the PIP function. In addition, the user can control the size of the combined target image, to allow easier editing and combining of a desired image.

As another example, if the captured image and the broadcast image are to be combined according to the OSD method, signals of the target image which have been converted into a translucent state (or a relatively semi-transparent state) by the alpha blending module 142 are applied together with background image signals to the OSD module 141c within the combining module 141. Then, the OSD module 141c may perform graphics processing to overlap the translucent target image onto the background image. Such combined images may be stored in the storage unit 170, and at the same time, may also be outputted through the display unit 150.

As still another example, when the taken image and the broadcast image are to be combined according to the object extraction method, the extracted object image may be applied together with the background image signal to the object combining module 141c. When a position where the object image is to be combined is designated by the object combining module 141c, the object image is overlapped at the position where the background image has been designated and outputted to the display unit 140. Here, the object combining module 141c can also adjust the size of the object image to be overlapped onto the background image.

Accordingly, the terminal of the present invention may support the PIP (Picture In Picture) method in which a target image is adjusted in size and combined at a designated position of the background image, the OSD (On Screen Display) combining method for alpha-blending a target image, converting it into a translucent state, and performing OSD combining thereto, and an object combining method for extracting an object along a contour line (or outline) of the selected object of the target image and performing overlap combining with the background image. It should be noted that the target image and the background image can be selectively interchanged.

An exemplary method for combining image signals of a terminal in accordance with a first embodiment of the present invention will now be described with reference to FIG. 5. In the present invention, it is assumed that the terminal has a video (TV) broadcast reception function and a camera function.

First, when the TV broadcast reception function is operated, a broadcast image is outputted through the display screen of the terminal (step S101). When a capture command is inputted while the broadcast image is being outputted through the screen of the terminal, an image outputted at the moment when the capture command was inputted may be stored (step S102). Here, it can be understood that previously displayed broadcast images may be temporarily stored in memory, with the memory being continuously updated with the most recent broadcast images. By doing so, the user may refer back to broadcast images that were just displayed moments ago. This is useful because the user may not always be ready to enter the image capture command or may miss the desired image while the broadcast images are being displayed.

And then, the camera function may be operated to take and store another image (step S103). Here, it can be understood that the user may refer to previously stored images that is to be combined with the selected broadcast image. Also, it is described that the step S103 is performed following the steps S101 and S102, but steps can be performed by changing their order.

The present invention is directed to combining a broadcast image and a camera-taken image and proposes a PIP combining mode, an OSD combing mode and an object combing mode. But, other image combining techniques also fall within the scope of the present invention.

Before combining the desired images, the terminal may first check a combing code set in the terminal (step S104). For example, when the combining mode is the PIP combining mode, an image to be a PIP target is designated (step S105). The PIP target image can be an image captured from a video (TV) broadcast image, a preview image for camera photographing, an image obtained by camera photographing, or the like.

Subsequently, the size of the PIP target image and a position of a screen to which the PIP target image is to be inserted are selected (step S106). Since the PIP target image is an image to be inserted into a portion of the screen, it may be scaled down (reduced) not to entirely cover the background image. The size of the PIP target image may be set according to a user command, and a change in the size of the PIP target image may be immediately reflected and outputted on the screen. The position where the PIP image is to be inserted may be designated at a left upper end, a left lower end, a right upper end and a right lower end, and also can be designated at a position where the PIP target image is to be placed by a drag tool option provided to the user for selection thereof.

After the size and the position of the PIP image are selected, the background image and the PIP target image are combined (step S111). Here, the background image may be a broadcast image or a camera-taken image stored in the memory. The combined images may then be displayed on the display screen of the terminal, and also may be temporarily or semi-permanently stored in the memory (step S112).

In a different embodiment of the present invention, when the combining mode is the OS combining mode, an image to be an OSD target is designated (step S107). The OSD target image may be an image captured from a video (TV) broadcast image, a preview image for camera photographing, an image obtained by camera photographing or the like.

The OSD target image may be alpha-blended to convert an opaque image into a relatively translucent (semi-transparent) image (step S108). A value (or amount) of transparency for the alpha-blending can be adjusted accordingly, such that the degree of transparency can be changed.

After the OSD target image is converted into the translucent state, the image is combined with a background image (step S111). The background image may be a broadcast image or a camera-taken image stored in the memory. The combined images may then be displayed on the screen of the terminal, and also may be temporarily or semi-permanently stored in the memory (step S112).

Here, the OSD target image may be converted into the translucent image through the alpha-blending, which is then combined with the background image as the translucent image, but it can be set such that the two combined images are all alpha-blended together and the translucent images are then combined.

In a still different embodiment of the present invention, when the combining mode is the object combining mode, an image for extracting an object among a camera-taken image and a broadcast image stored in the memory is designated (step S109). The corresponding object image may be extracted along a contour line (or outline) of the objected selected from the image (step S110). Subsequently, the extracted object image is combined with a background image (step S111). Here, the background image may be a broadcast image or a camera-taken image stored in the memory. The combined images may then be displayed on the screen of the terminal, and may also be temporarily or semi-permanently stored in the memory (step S112).

Figure 5:
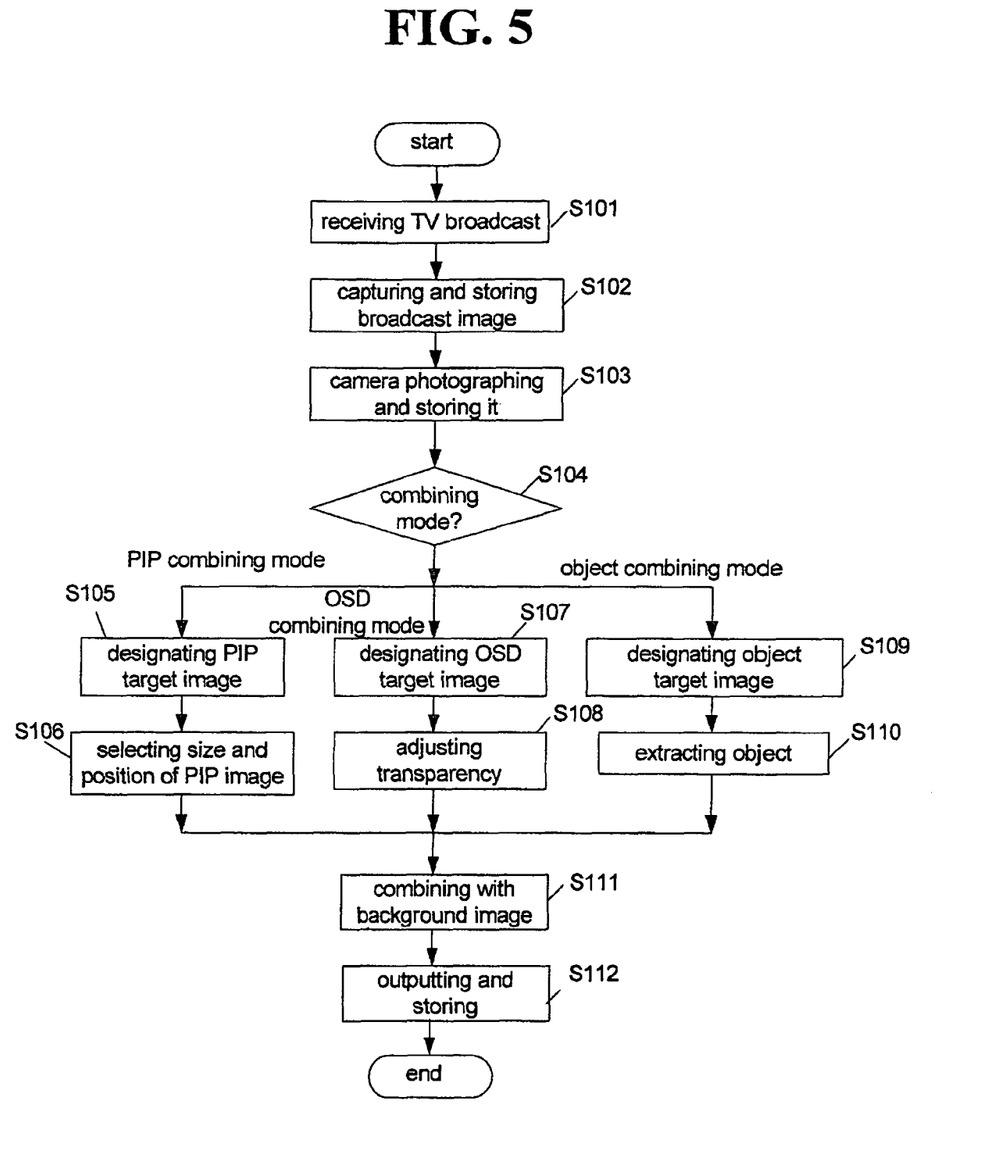
FIG. 5 is a flow chart illustrating the processes of an exemplary method for combining images of the terminal in accordance with one embodiment of the present invention.
Figure 6:
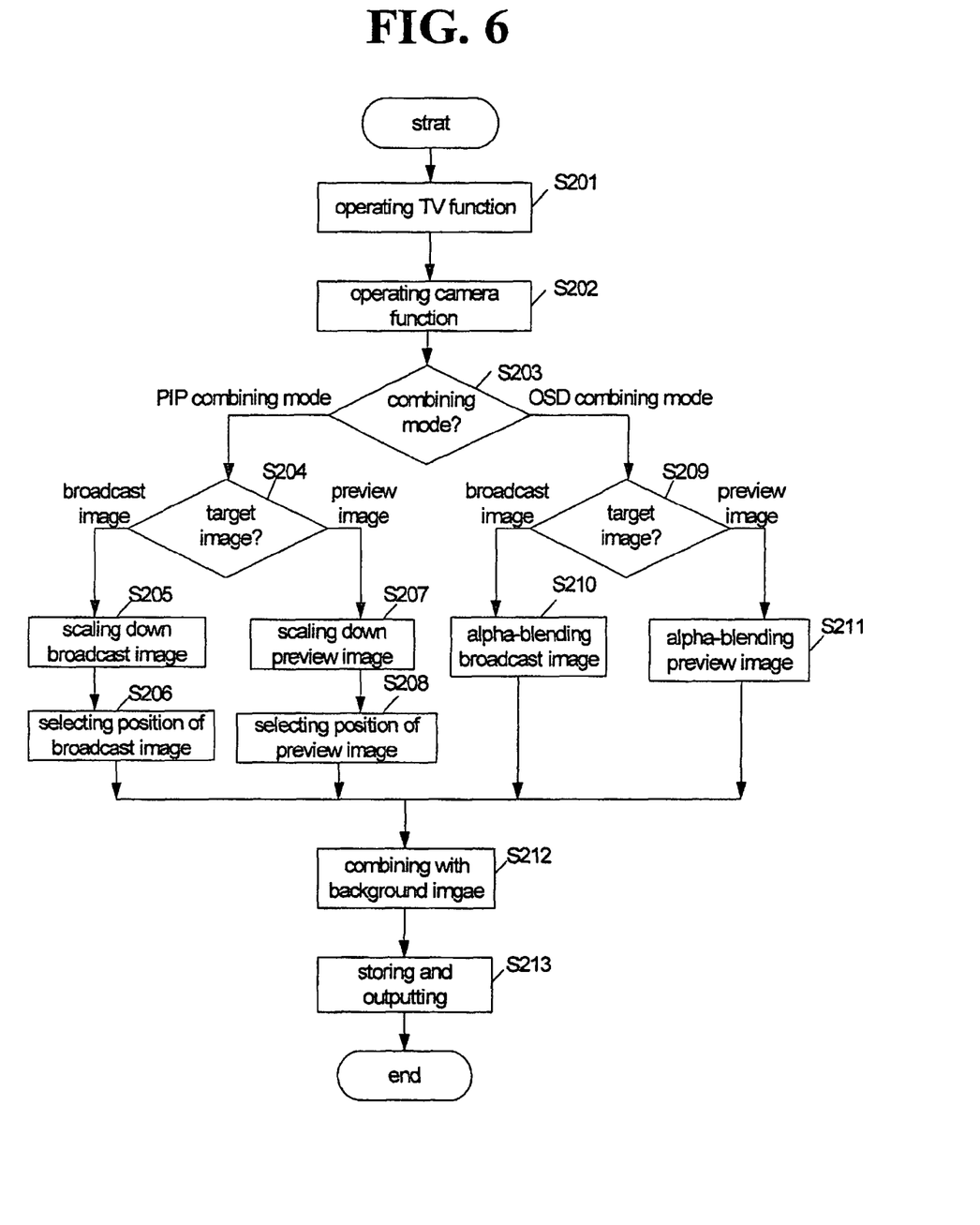
FIG. 6 is a flow chart illustrating the processes of an exemplary method for combining images of the terminal in accordance with another embodiment of the present invention.

Compared with the case with reference to FIG. 5 showing the image combining method on the assumption that the broadcast image and the camera-taken image have been previously stored in the memory, FIG. 6 shows an image combining method in which composited images are provided in real time.

FIG. 6 is a flow chart illustrating the processes of an exemplary method for combining images of the terminal in accordance with the present invention. In the present invention, the terminal may support multitasking of the camera function and the video (TV) broadcast reception function.

First, the camera function may be operated after the TV function of the terminal is activated, or the TV function may be activated after the camera function is operated (steps S201 and S202). The TV function is used to output a broadcast image through the display screen, while the camera function is used to output a preview image or a camera-taken image through the display screen. Thus, if the two functions are simultaneously used, a display screen region allocated for the TV function and a screen region allocated for the camera function may need to be discriminated (by using a split screen function), or an image may be converted into a translucent state and overlapped on a different translucent image so as to be displayed.

Thus, when the camera function and the TV function are simultaneously performed by using the terminal, images for each function may be combined and displayed on one screen. The combining method in accordance with the present invention provides the PIP combining mode and the OSD combining mode.

In case of the PIP combining mode, it is discriminated whether the PIP target image is a broadcast image or a preview image (steps S203 and S204). If the target image is a broadcast image, the selected broadcast image may be scaled down to a pre-set size (step S205). Because the PIP target image is an image to be inserted into a portion of the entire screen, it is to be scaled down not to entirely cover the whole background image. The size of the PIP target image can be set according to a user command (or there may be a pre-set default value), and a change in the size of the PIP target image can be immediately reflected and outputted on the screen. Subsequently, a position of the screen at which the scaled down PIP target image is to be inserted may be selected (step S206). The position where the PIP image is to be inserted can be designated at a left upper end, a left lower end, a right upper end and a right lower end, and also can be designated at a position where the PIP target image is to be placed by a drag tool option on a selectable user interface.

After the size and the position of the PIP image are selected, the background image and the PIP target image are combined (step S212). If the target image is a preview image for camera photographing, the preview image is scaled down, a position where the image is to be inserted is selected, and then, the image is combined with a background image (steps S207 and S208).

Namely, while the broadcast image is being outputted on the background screen, a preview image for camera photographing can be displayed on a PIP screen, or while a preview image for camera photographing is being displayed on the background screen, a broadcast image can be outputted on a PIP screen. The background screen and the PIP screen can be interchanged by manipulating a key allocated for changing the screen in the terminal.

The combined image may be displayed through the screen, and may be stored as video or as a still image in the memory (step S213).

Meanwhile, in case of the OSD combining mode, it is discriminated whether an OSD target image is a broadcast image or a preview image (step S209). If the OSD target image is a broadcast image, the broadcast image is alpha-blended and converts an opaque image into a translucent (or relatively semi-transparent) image (step S210). The value (or amount) of transparency for the alpha-blending can be adjusted. When the OSD target image is converted into the translucent state, the translucent image is combined with a background image (step S212). If the OSD target image is a preview image, the preview image may be alpha-blended so as to be converted into the translucent image (step S211), and then, the converted image is combined with the background image (step S212).

In other words, the terminal in accordance with the present invention may display the translucent preview image or displays a translucent TV broadcast image on an opaque preview image.

Here, the OSD target image may be converted into the translucent image through the alpha-blending process, which is then combined with the opaque background image as it is. However, it can be set such that the two combined images are alpha-blended and then the translucent images are combined. In addition, when a subject is photographed by using the camera function, the taken image may be processed according to the same method as used for the preview image, so that the camera taken image may be displayed at a position where the preview image is displayed.

Though not shown in FIG. 6, when the object extraction mode is set, a broadcast image or a preview image (camera-taken image) may be used as a background image and a stored object image extracted from a memory may be overlapped with the background image. In this case, the background image may be video or a still image, and the overlapped object image may be a still image.

Figure 7:
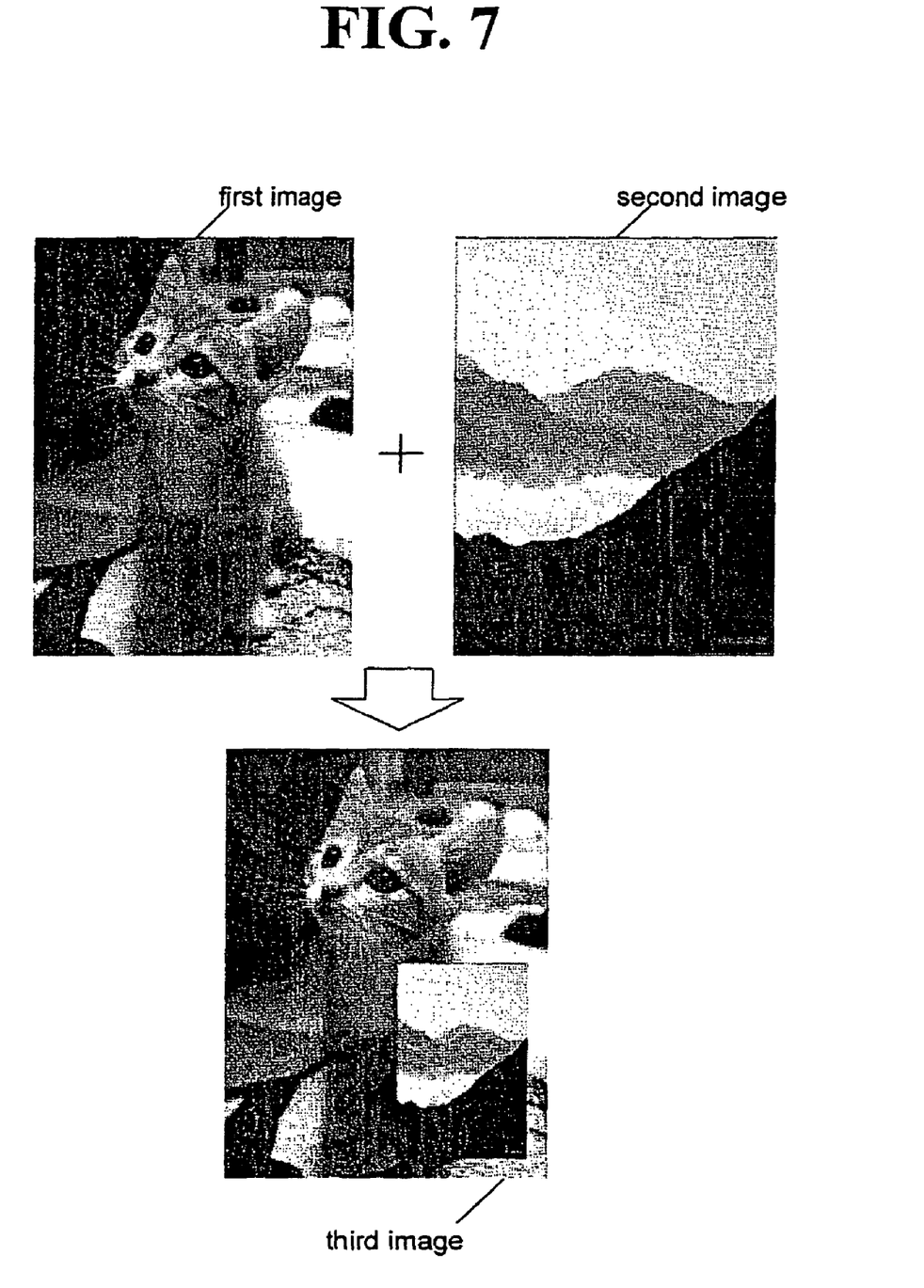
FIG. 7 shows an exemplary PIP (picture-in-picture) combined images of the terminal in accordance with the present invention.

A method for combining images using the PIP combining mode will now be described with reference to FIG. 7, which shows exemplary PIP combined images. Here, a broadcast image (a first image) may be designated as a background image and a camera taken image (a second image) may be designated as a target image.

The terminal in accordance with the present invention supports multi-tasking, such that an image of a subject may be taken through a camera while receiving a TV broadcast by operation of the broadcast reception unit. In this case, a preview image for previously showing an image for photographing through the camera is a PIP target image (the second image) and displayed at a portion of the broadcast image (the first image).

The size and position of the PIP target image (the second image) can be adjusted, and the entire image (the third image) displayed on the screen of the terminal can be stored or only the PIP image (the second image) can be stored. Namely, the entire image (the third image) obtained by combining the broadcast image and the camera taken image can be stored, or the broadcast image (the first image) and the camera taken image (the second image) can be both displayed on the screen for supporting multi-tasking of the TV broadcast reception function and the camera function but only the preview image (the second image) can be stored.

Herein, merely for the sake of explanation, the broadcast image is set as the background image while the camera taken image is set as the target image. But, the opposite may also be permitted. Accordingly, in the present invention, the function allowing a user to watch a TV broadcast through the PIP image while performing photographing by using the camera and the function allowing the user to perform photographing by using the PIP image while watching the TV broadcast are provided.

Figure 8:
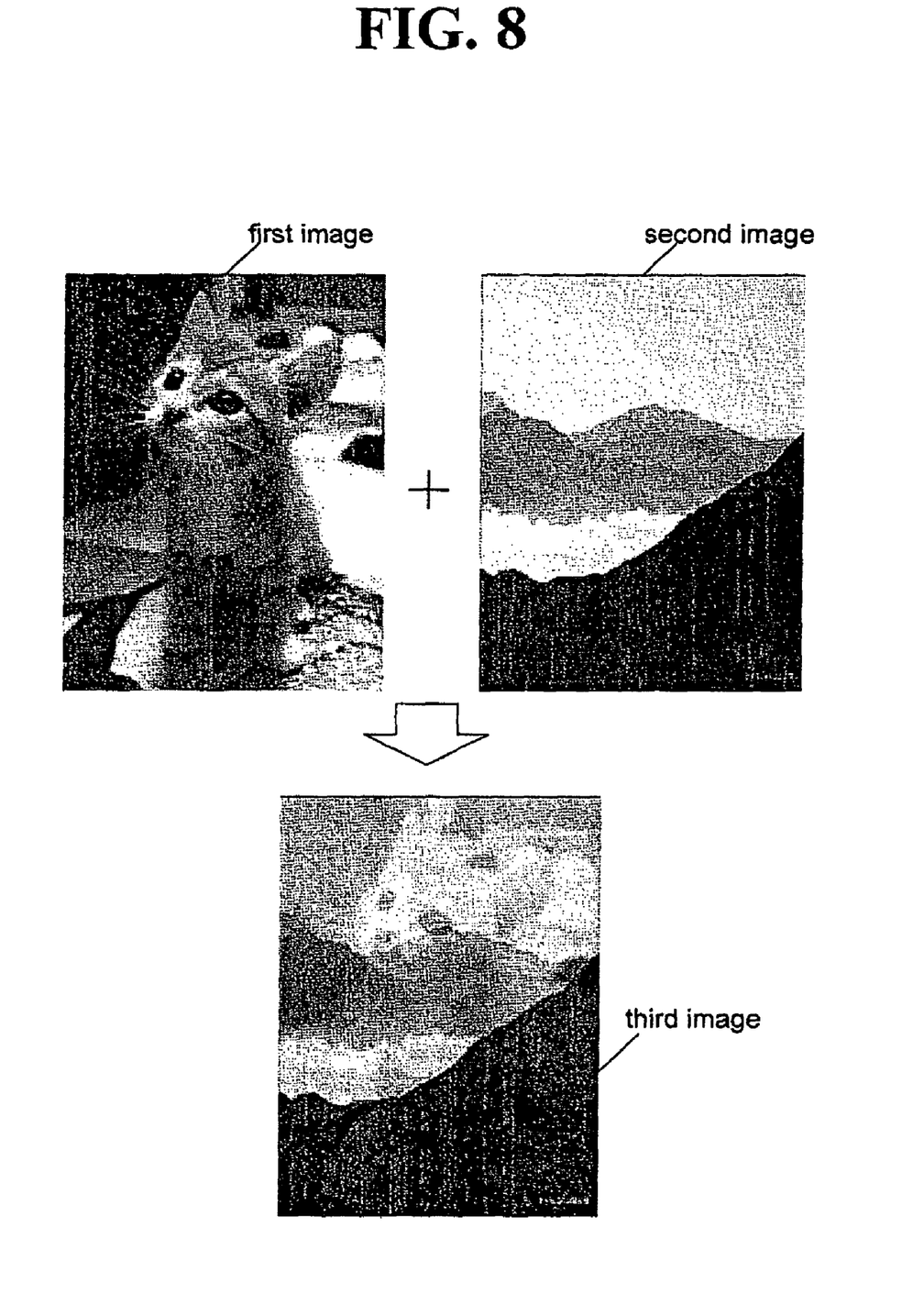
FIG. 8 shows an exemplary OSD (on-screen display) combined image of the terminal in accordance with the present invention.

FIG. 8 illustrates exemplary images combined according to the OSD method. A broadcast image (a first image) is designated as a target image and a camera taken image (a second image) is designated as a background image. The target image (the first image) is alpha-blended into a translucent state, which is then combined on the opaque background image (the second image).

In the present invention, the terminal can operate the camera function in a state that the broadcast image is being displayed on the screen by operating the TV broadcast reception function. At this time, the image signal for generating a preview screen is applied to the alpha-blending module 142, and a translucent preview image is generated. The value of transparency that the alpha-blending module 142 converts an image into a translucent state is changeable, and can be determined according to a user command inputted through the input unit 160.

The translucent image generated by the alpha-blending module 142 is displayed in an overlap state on the background image in the screen, and the entire image (a third image)

displayed on the screen is stored. In this respect, however, the target image (the first image) or the preview image (the second image) can be separately stored according to a set operation mode.

Herein, the case where the broadcast image is set as the target image and the camera taken image is set as the background image, and the translucent broadcast image is combined on the opaque camera-taken image has been described, but it can be also implemented that, conversely, a translucent camera-taken image is combined on an opaque broadcast image. In addition, both the broadcast image and the camera taken image can be converted into a translucent state, and then, the two images can be overlapped.

Figure 9:
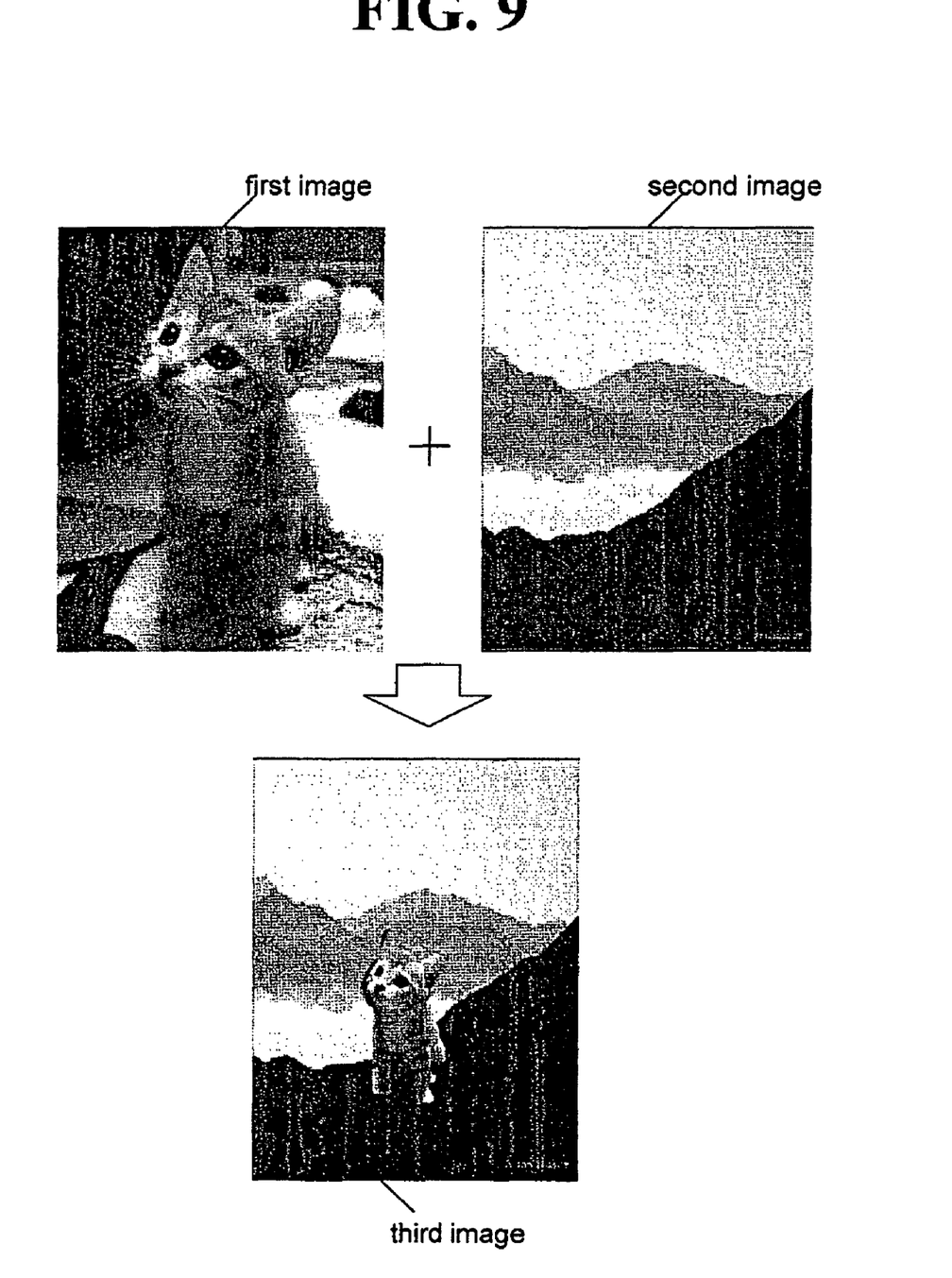
FIG. 9 shows an exemplary object combined image of the terminal in accordance with the present invention.

FIG. 9 shows an exemplary image combined according to the object extraction method. A broadcast image is designated as an object extraction target image (a first image) and a camera taken image is designated as a background image (a second image).

When the broadcast receiving unit 120 receives a TV broadcast signal, a broadcast image is outputted to the display unit 150, and the broadcast image displayed on the display unit 150 can be captured by using a capture module 144. A corresponding object can be extracted along a contour line of a designated object among the captured broadcast image. Here, besides the broadcast image, the object extracting module 143 can extract an object image from video or a still image stored in the terminal.

The object image separated by the object extracting module 160 is stored in the storage unit 170, and when the camera function is operated in the combining mode, the object image is applied to the object combining module 181c. The object combining module 181c overlaps the extracted object image (a portion of a first image) on the preview screen (a second image) provided for photographing and outputs such through the display unit 150. The image (a third image) combined by the object combining module 181c is outputted to the display unit 150 and at the same time stored in the storage unit 170.

It can be said that the present invention provides a mobile communication terminal comprising: a broadcast receiver to receive digital multimedia broadcast signals; an image capturing module to obtain images from the digital multimedia broadcast signals; a camera device to capture images of objects; a memory to store the images from the image capturing module and from the camera device; a display to display the images; a processor cooperating with the broadcast receiver, the image capture module, the camera device, the memory, and the display to perform the steps of, performing image processing on at least one image selected from the memory; combining the image processed image with a different image stored in the memory or with the digital multimedia broadcast signals being received to form a combined image; and displaying the combined image on the display.

Here, the processor may perform image processing by adjusting a size of the selected image, by adjusting a degree of transparency of the selected image, or by obtaining a portion of the selected image.

The present invention also provides a method of processing information of digital multimedia data in a mobile communication terminal, comprising the steps of: receiving digital multimedia broadcast signals; storing images from the received digital multimedia broadcast signals and from other image capturing means into a memory; performing image processing on at least one image selected from the memory by adjusting a size of the selected image, by adjusting a degree of transparency of the selected image, or by obtaining a portion of the selected image; combining the image processed image with a different image stored in the memory or with the digital multimedia broadcast signals being received to form a combined image; and displaying the combined image.

In the explanation of the image combining method in accordance with the present invention, the case where the broadcast image according to the TV broadcast reception function and the camera-taken image according to the camera function are combined has been described merely as an example. However, every image stored in the terminal such as an image downloaded from a base station through the wireless Internet connection or an image downloaded through wired/wireless communication interface from a different terminal can be used for the image combining. In addition, the image combining apparatus in accordance with the present invention can adjust the size of images (e.g., scale down images) besides the broadcast image and the camera taken image stored in the terminal, convert them into a translucent state, or extract an object for combining.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An apparatus for combining image of a terminal which receives a broadcast image signal, comprising:
   a capture module for capturing and storing a specific scene of a broadcast image;
   a first processor for selecting a first image among images stored in the terminal and converting it into a translucent image; and
   a second processor for selecting a second image among the images stored in the terminal and overlapping the first image on the second image, wherein the images stored in the terminal comprise an image downloaded via the wireless Internet by the terminal.

2. The apparatus of claim 1, further comprising:
   an input unit for inputting a signal for controlling transparency set in the first processor.

3. The apparatus of claim 1, wherein the images stored in the terminal comprise an image taken according to a camera function of the terminal.

4. An apparatus for combining image of a terminal which receives a broadcast image signal, comprising:
   a capture module for capturing and storing a specific scene of a broadcast image;
   a first processor for selecting first and second images among images stored in the terminal and converting them into translucent images; and
   a second processor for overlapping the first image on the second image, wherein the images stored in the terminal comprise an image downloaded via the wireless Internet by the terminal or an image taken according to a camera function of the terminal.

5. The apparatus of claim 4, further comprising:
   an input unit for inputting a signal for controlling transparency set in the first processor.

6. An apparatus for combining images of a terminal which receives a broadcast image signal comprising:
   a capture module for capturing and storing a specific scene of a broadcast image;

a first processor for selecting a first image of images stored in the terminal, converting the first image into a translucent image, scaling down the first image, or extracting an object image from the first image, wherein the first processor selects a position where the scaled down image is to be overlapped thereon; and a second processor for selecting a second image of the images stored in the terminal and overlapping the scaled-down image or the object image on the second image.

7. The apparatus of claim 6, further comprising:

an input unit for inputting a command for interchangeably switching the first scaled-down image and the second image to the second processor.

8. The apparatus of claim 7, wherein the input unit inputs a signal for controlling transparency set in the first processor.

9. The apparatus of claim 6, wherein the images stored in the terminal comprise an image downloaded through the wireless Internet by the terminal.

10. The apparatus of claim 6, wherein the images stored in the terminal comprise an image taken according to a camera function of the terminal.

11. A method for combining images of a terminal having a broadcast image reception function, comprising:

capturing and storing a broadcast image;

selecting first and second images from images stored in the terminal; and converting the first image according to an image combining mode set in the terminal, wherein the image combining mode comprises an on-screen-display (OSD) combining mode in which the first image is converted into a translucent image and then overlapped on the second image.

12. The method of claim 11, wherein the image combining mode comprises a picture-in-picture (PIP) combining mode in which the first image is scaled down and overlapped on the second image.

13. The method of claim 12, wherein the PIP combining mode comprises:

scaling down the first image; and selecting a position of the second image where the scaled-down first image is to be overlapped thereon.

14. The method of claim 11, wherein the first and second images are converted into translucent images in the OSD combining mode, and the first image is overlapped on the second image.

15. The method of claim 11, wherein the image combining mode comprises:

an object extracting mode in which a selected object image is extracted from the first image and overlapped on the second image.

16. The method of claim 11, further comprising:

displaying the overlapped image; and interchanging the first and second images.

17. The method of claim 11, wherein the images stored in the terminal comprise an image downloaded through the wireless Internet by the terminal.

18. The apparatus of claim 11, wherein the images stored in the terminal comprise an image taken according to a camera function of the terminal.

19. A mobile communication terminal comprising:

a receiver to receive a digital multimedia broadcast signal;

an image extracting module to extract a still image from the received digital multimedia broadcast signal, wherein the received digital multimedia broadcast signal comprises a moving image;

a camera device to capture an image;

a memory to store the extracted still image and the captured image, wherein the stored captured image is visually similar to the captured image;

a display to display at least the stored extracted still image or the stored captured image; and a processor cooperating with the broadcast receiver, the image extracting module, the camera device, the memory, and the display, wherein the processors is configured to:

process at least one stored captured image, combine the at least one processed stored captured image with at least one stored extracted still image to create a combined image, and output the combined image to the display.

20. The terminal of claim 19, wherein the processor processes the at least one stored captured image by adjusting a size, by adjusting a degree of transparency, or by obtaining a portion of the at least one stored captured image.

21. A method of processing information of digital multimedia data in a mobile communication terminal, the method comprising:

Receiving a digital multimedia broadcast signal, wherein the received digital multimedia broadcast signal comprises a moving image;

extracting a still image from the received digital multimedia broadcast signal;

storing the extracted still image and a captured image from an image capturing means in a memory, wherein the stored captured image is visually similar to the captured image;

processing at least one stored captured image selected from the memory by adjusting a size, by adjusting a degree of transparency, or by obtaining a portion of the at least one stored captured image;

combining the processed at least one stored captured image with at least one stored extracted still image to create a combined image; and displaying the combined image.

* * * * *